(12) United States Patent
Duquet et al.

(10) Patent No.: US 10,040,084 B2
(45) Date of Patent: Aug. 7, 2018

(54) FLUID DISPENSER

(75) Inventors: Frédéric Duquet, Saint Germain en Laye (FR); Sandra Martins-Reis, Malakoff (FR); Francis Moreau, Sotteville les Rouen (FR)

(73) Assignee: APTAR FRANCE S.A.S., Le Neubourg (FR)

(*) Notice: Subject to any disclaimer, the term of this patent is extended or adjusted under 35 U.S.C. 154(b) by 727 days.

(21) Appl. No.: 13/556,789

(22) Filed: Jul. 24, 2012

(65) Prior Publication Data
US 2013/0026191 A1      Jan. 31, 2013

Related U.S. Application Data

(60) Provisional application No. 61/544,820, filed on Oct. 7, 2011.

(30) Foreign Application Priority Data

Jul. 25, 2011   (FR) .................... 11 56778

(51) Int. Cl.
*G01F 11/00*      (2006.01)
*B05B 11/00*      (2006.01)
(Continued)

(52) U.S. Cl.
CPC ........ *B05B 11/0035* (2013.01); *B01L 3/0265* (2013.01); *B01L 3/0272* (2013.01);
(Continued)

(58) Field of Classification Search
CPC .... B01L 3/021; B01L 3/0272; G01F 25/0092; B65D 83/0033
(Continued)

(56) References Cited

U.S. PATENT DOCUMENTS 2,966,284 A * 12/1960 Lewis .......................... 604/207
3,820,698 A * 6/1974 Franz ........................... 222/205
(Continued)

FOREIGN PATENT DOCUMENTS

| JP | 7-22958 U | 4/1995 |
| WO | 2009/073482 A1 | 6/2009 |
| WO | 2011/090251 A2 | 7/2011 |

OTHER PUBLICATIONS

French Search Report for FR 1156778 dated Feb. 28, 2012.

*Primary Examiner* — Patrick M Buechner
*Assistant Examiner* — Michael J Melaragno
(74) *Attorney, Agent, or Firm* — Sughrue Mion, PLLC

(57) ABSTRACT

A fluid dispenser comprising:
 a fluid reservoir (1); and
 a pump (3) comprising a pump body (30) and an actuator rod (34), defining between them a pump chamber (33) having a predetermined maximum volume, the rod (34) being axially movable in the body (30) so as to vary the volume of the pump chamber (33);
 the dispenser being characterized in that it further comprises a dispenser cannula (5) that is mounted on the actuator rod (34) and that includes a dispenser outlet (52) that is suitable for forming a drop of fluid that separates from the cannula (5) by gravity, the determined maximum volume of the pump chamber (33) being substantially equal to the volume of the drop of fluid that is dispensed at the dispenser outlet (52).

13 Claims, 1 Drawing Sheet

(51) Int. Cl.
*B01L 3/02* (2006.01)
*G01F 11/02* (2006.01)
(52) U.S. Cl.
CPC ...... *B05B 11/0037* (2013.01); *B05B 11/0059* (2013.01); *B05B 11/3004* (2013.01); *B05B 11/309* (2013.01); *B05B 11/3015* (2013.01); *B05B 11/3094* (2013.01); *G01F 11/027* (2013.01); *B01L 2300/0838* (2013.01); *B01L 2400/0457* (2013.01); *B01L 2400/0478* (2013.01); *B01L 2400/0616* (2013.01); *B05B 11/0048* (2013.01); *B05B 11/3074* (2013.01)

(58) Field of Classification Search
USPC ..... 222/256, 422, 16, 21, 14, 328, 344, 354, 222/372, 377, 320, 321.1–321.9, 222/260–263, 373, 378, 383.1; 422/501, 422/502, 505, 521–523
See application file for complete search history.

(56) References Cited

U.S. PATENT DOCUMENTS

| | | | | |
|---|---|---|---|---|
| 4,722,459 A | * | 2/1988 | Goncalves | 222/135 |
| 4,944,430 A | * | 7/1990 | Graf et al. | 222/259 |
| 5,226,572 A | * | 7/1993 | Gargione | 222/214 |
| 5,257,726 A | * | 11/1993 | Graf et al. | 222/320 |
| 5,320,810 A | | 6/1994 | Al-Mahareeq et al. | |
| 5,692,649 A | * | 12/1997 | Schwab | 222/321.3 |
| 6,345,737 B1 | * | 2/2002 | Martin et al. | 222/320 |
| 6,533,482 B1 | * | 3/2003 | Byun | 401/180 |
| 2010/0170917 A1 | * | 7/2010 | Ki | 222/256 |

* cited by examiner

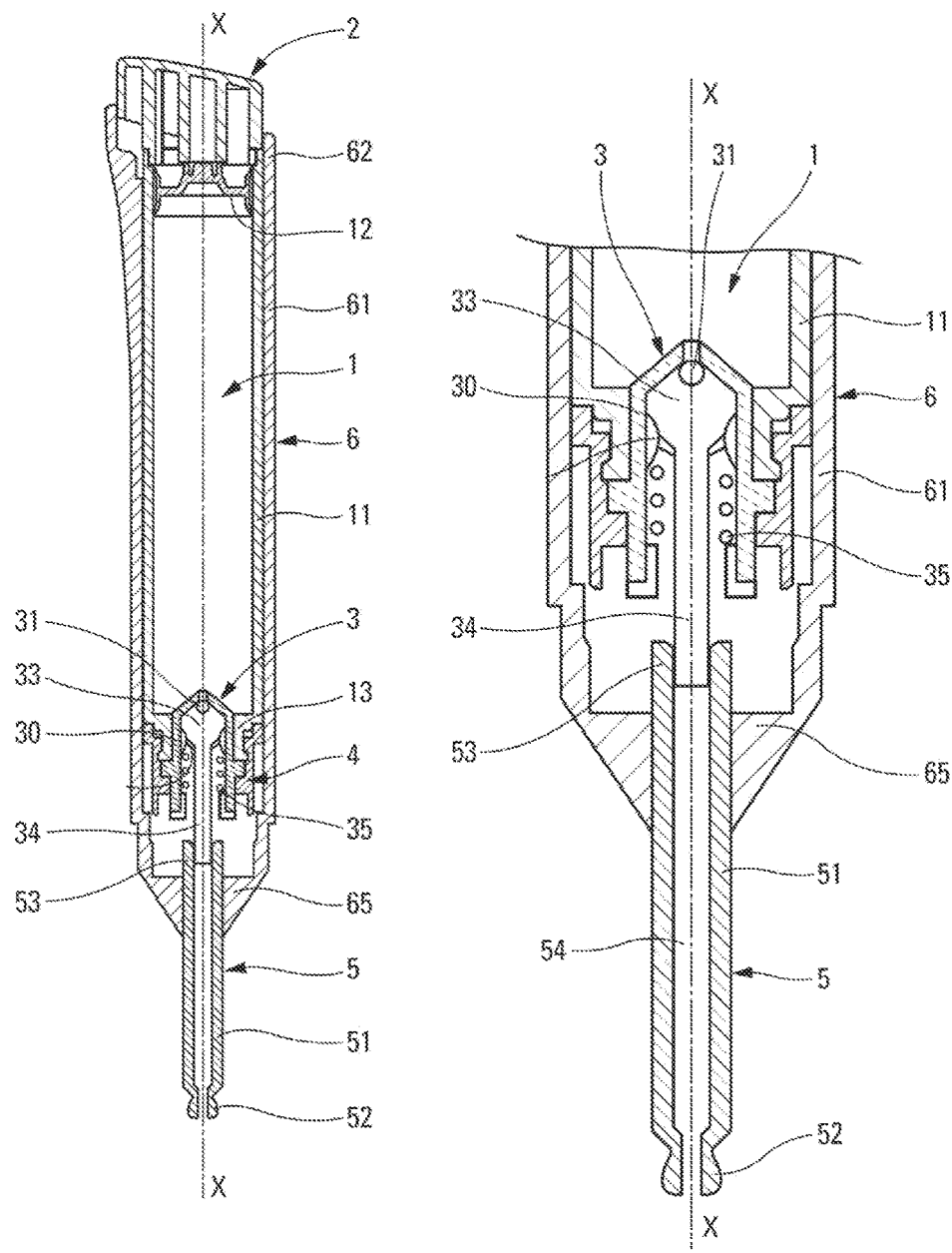

FLUID DISPENSER

CROSS REFERENCE TO RELATED APPLICATION

This application claims the benefit under 35 U.S.C. § 119(e) of U.S. provisional patent application Ser. No. 61/544,820, filed Oct. 7, 2011, and priority under 35 U.S.C. § 119(a)-(d) of French patent application No. 11 56778, filed Jul. 25, 2011. The foregoing applications are incorporated herein by reference in their entirety.

TECHNICAL FIELD

The present invention relates to a fluid dispenser comprising a fluid reservoir and a conventional manual pump that defines a variable-volume pump chamber between a pump body and an actuator rod. The purpose of moving the actuator rod is to vary the volume of the pump chamber that, in the rest position, defines a predetermined maximum volume. This type of dispenser is very frequently used in the fields of perfumery, cosmetics, or even pharmacy for dispensing fluids of diverse viscosities.

BACKGROUND OF THE INVENTION

In the prior art, dispensers also exist in the form of pipettes comprising a dispenser cannula that forms a dispenser outlet that is suitable for forming a drop of fluid that is separated from the cannula by gravity. In general, the cannula is associated with a kind of suction bulb that makes it possible to suck fluid into the cannula through the dispenser outlet. Then, the cannula and its associated bulb are removed from the fluid reservoir, and dispensing is thus performed by squeezing the bulb so as to drive the fluid through the dispenser outlet drop by drop. In other words, the fluid enters and leaves the cannula via its dispenser outlet. Once the cannula is empty, it is once again deposited in the fluid reservoir for a subsequent actuation. This design is entirely conventional for a dispenser in the form of a pipette that is frequently used for dispensing serum in the fields of perfumery and cosmetics. Users appreciate this type of dispenser/pipette that enables the serum to be dispensed in metered manner, namely drop by drop.

However, a drawback exists with this type of dispenser/pipette associated with the fact that the cannula is dipped into the fluid stored in the reservoir. As a result, fluid adheres to the outside wall of the cannula and collects by gravity at the dispenser outlet, such that a partial or a complete drop may form at this location. The partial or complete drop may be lost in handling the cannula, or may even increase the volume of the drop that is dispensed, in such a manner as to falsify the dosage. Either way, the fluid situated on the outside wall of the cannula can only be detrimental to proper operation of the dispenser/pipette. In addition, there is also a risk of knocking over the reservoir that is left open.

BRIEF SUMMARY OF THE INVENTION

Consequently, an object of the present invention is to remedy the above-mentioned drawbacks of the prior art by defining a novel type of dispenser that is particularly suitable, and to do so by replacing a conventional dispenser/pipette. The first object of the present invention is to avoid any loss of fluid from the cannula. Another object of the present invention is to dispense well formed drops that are not subjected to being sprayed at the dispenser outlet. Still another object of the present invention is to improve the actuation of the dispenser, in such a manner as to enable drops to be dispensed with increased accuracy. Still another object of the invention is to guarantee good conservation of the fluid stored in the reservoir of the dispenser.

To do this, the present invention proposes a fluid dispenser comprising: a fluid reservoir; and a pump comprising a pump body and an actuator rod, defining between them a pump chamber having a predetermined maximum volume, the rod being axially movable in the body so as to vary the volume of the pump chamber; the dispenser being characterized in that it further comprises a dispenser cannula that is mounted on the actuator rod and that includes a dispenser outlet that is suitable for forming a drop of fluid that separates from the cannula by gravity, the determined maximum volume of the pump chamber being substantially equal to the volume of the drop of fluid that is dispensed at the dispenser outlet. Thus, the fluid flows through the cannula in a single direction only, unlike the above-mentioned prior-art dispenser/pipette. The fluid from the reservoir passes through the pump, the actuator rod, then the cannula, so as to be delivered finally at the dispenser outlet in the form of a drop. The use of a pump avoids the handling that is required of the conventional dispenser/pipette of the prior art, namely dipping the cannula into the fluid reservoir. Thus, any risk of loss of fluid directly from the reservoir or accumulated around the cannula is avoided. In addition, as a result of the volume of the pump chamber corresponding approximately to the volume of the drop delivered at the dispenser outlet, a drop of fluid is delivered each time the pump is actuated. Thus, there is no risk of delivering more than a drop on each actuation.

In another advantageous aspect of the present invention, the dispenser cannula defines a predetermined internal volume that corresponds to about 3 to 7 times, and preferably 4 to 6 times, the maximum volume of the pump chamber. In this way, the fluid from the actuator rod of the pump arrives in a volume that is proportionally much greater, such that increased head loss occurs inside the cannula, thereby avoiding any dispensing in the form of spray. In other words, the dose of fluid driven under pressure by the pump through its actuator rod is damped inside the cannula so that, at its dispenser outlet, the fluid is dispensed in the form of a drop of volume that is sufficient to separate from the cannula by gravity. It can be considered that the large internal volume of the dispenser cannula makes it possible to absorb the increased pressure created by the pump.

In an embodiment, the dispenser cannula may be made out of a transparent material, such as glass. Thus, the dispenser presents a general configuration that is substantially similar or comparable to the configuration of a prior-art dispenser/pipette.

In an advantageous embodiment, the dispenser includes a pusher for actuating the pump, the pusher being secured to the reservoir. As a result, the pusher moves the reservoir and the pump body. Advantageously, the dispenser includes a casing in which the reservoir is slidably mounted, the cannula being secured to the casing. The user may thus take hold of the dispenser via the casing, and actuate the pusher with the thumb. The user's action is thus substantially similar or identical to the action required with a conventional pipette.

In another aspect of the invention, the reservoir includes a follower piston that moves as fluid is extracted from the reservoir. Thus, the fluid is never in contact with the outside air.

According to another characteristic of the invention, the maximum volume of the pump chamber lies in the range about 50 milliliters (mL) to about 70 mL. In the invention, this volume corresponds to the volume of a drop of fluid that is dispensed at the dispenser outlet.

In a practical embodiment, the casing includes an open trailing end in which a pusher is axially movable, and a leading end in which the cannula is mounted in stationary manner, projecting axially with its dispenser outlet, the pusher, during its actuation, moving the reservoir and the pump body in the casing, compressing a return spring. The dispenser is thus similar to a conventional pipette having a casing that is held in the user's palm by means of four fingers, and having a pusher that is actuated by means of the thumb.

One of the principles of the invention resides in using a conventional pump associated with a drop-dispensing cannula so as to form a dispenser that is similar to a prior-art dispenser/pipette. Another principle of the present invention is to use the dispenser cannula as a fluid damping space, so as to guarantee that a drop is formed perfectly at the dispenser outlet of the cannula. Still another principle is to use a casing for containing the reservoir, the pump, and the cannula.

BRIEF DESCRIPTION OF THE DRAWINGS

The present invention is described more fully below with reference to the accompanying drawings, which show an embodiment of the present invention by way of non-limiting example.

In the figures:

FIG. 1 is a vertical section view through a fluid dispenser of the invention; and FIG. 2 is a larger-scale view of the bottom portion of FIG. 1.

DETAILED DESCRIPTION

The dispenser shown in the figures comprises six component elements, namely: a reservoir 1; a pusher 2; a pump 3; a fastener ring 4; a dispenser cannula 5; and a casing 6. All of the component elements are disposed on a longitudinal axis X: some component elements may be circularly symmetrical around the axis X.

The fluid reservoir 1 includes a cylindrical slide cylinder 11 inside which a follower piston 12 is slidably mounted. When the reservoir is full, the piston 12 is situated at one end of the cylinder 11, remote from the other end that forms a neck 13. A volume is thus constituted of capacity that varies as the follower piston 12 is moved inside the slide cylinder 11. With this type of reservoir, the fluid contained in the reservoir is always protected from the outside air, and thus cannot deteriorate.

The pusher 2 is disposed at the end of the slide cylinder 11 that is remote from the neck 13, i.e. just above the follower piston 12, when the reservoir is full of fluid. The pusher 2 is secured to the cylinder 11. In a variant, the pusher 2 may even form an integral part of the cylinder 11 or of the reservoir 1. Thus, by pressing on the pusher 2, pressure is exerted on the reservoir 1, as described below.

The pump 3 is fastened in the opening 13 of the reservoir by means of a fastener ring 4. The pump 3 includes a pump body 30 that internally forms a pump chamber 33 of variable capacity, but defining a predetermined maximum volume in the rest position. The pump is defined by the pump body 30, but also by an actuator rod 34 that is axially movable inside the pump body. By way of example, the actuator rod 34 may be provided with a piston that slides in leaktight manner inside the pump body 30. The pump 3 is provided with an inlet valve 31, and with an outlet valve that may be incorporated in the actuator rod 34, or secured thereto. Thus, by pressing on the actuator rod 34, the volume of the pump chamber 33 varies from its maximum volume that may lie in the range about 50 mL to about 70 mL. The actuator rod 34 is movable from its rest position, against a return spring 35 that is situated outside the pump chamber 33. The dispensed dose of fluid product substantially corresponds to predetermined maximum volume of the pump chamber. In other words, the pump dispenses at each actuation substantially the whole of the fluid product present in the pump chamber. The spring 35 thus returns the pump chamber 33 into its predetermined maximum-volume configuration. This design is entirely conventional for a manual pump in the fields of perfumery, cosmetics, or even pharmacy, except for the spring 35 that is situated outside the pump chamber.

The dispenser cannula 5 may be made out of a transparent material, such as glass or a plastics material, for example. The cannula 5 may present perfect circular symmetry around the axis X. The cannula 5 includes a connection sleeve 53 that is engaged around the free end of the actuator rod 34 of the pump 3. The cannula 5 then forms a main elongate cylindrical section 51 that defines a predefined internal volume 54. At its end, the cannula 5 forms a dispenser outlet 52 that is suitable for forming a drop of fluid that separates from the cannula by gravity. The volume of the drops that are dispensed lies in the range about 50 mL to about 70 mL, just like the predefined maximum volume of the pump chamber 33. The dispenser cannula 5 presents a generally elongate configuration, similar to a conventional pipette. The internal volume of the cannula 5 corresponds to about 3 to 7 times, and preferably 4 to 6 times, the maximum volume of the pump chamber 33 that lies in the range about 50 mL to about 70 mL. In other words, the internal volume of the cannula lies in the range about 150 mL to about 500 mL. Preferably, the internal volume lies in the range about 200 mL to about 400 mL, and is preferably 300 mL. Thus, the content of the pump chamber 33 that is driven under pressure through the actuator rod 34 arrives in the cannula that is already full of fluid. The considerably-greater volume of the cannula relative to the dose that is dispensed makes it possible to create considerable head loss in the cannula, thereby making it possible to avoid fluid being dispensed in the form of spray. The fluid is thus damped in the cannula prior to being detached therefrom by gravity in the form of a drop having a capacity that lies in the range about 50 mL to about 70 mL.

The casing 6 constitutes a hollow shell 61 in which there is housed the reservoir 1, the pump 3, and a portion of the cannula 5. The casing 6 includes an open top end in which the pusher 2 is situated, and a bottom end that is extended by the cannula 5 that is mounted in stationary manner inside a head portion 65 of the casing 6: the casing and the cannula may be made as a single part, e.g. by bi-injection. The reservoir 1, the pump body 30, and the fastener ring 4 are axially movable down and up inside the casing 6 by pressing on the pusher 2, thereby causing the spring 35 to compress. In this way, the user may take hold of the dispenser in the palm of one hand via the casing 6, and press on the pusher 2 by means of the thumb. Actuation is thus similar to the actuation of a conventional pipette. Given that the casing 6 completely masks the reservoir 1 and the pump 3, the user is not even conscious of actuating a pump by pressing on the pusher 2. The user merely observes that by pressing on the pusher 2, a well-formed drop of fluid falls by gravity from the end of the cannula 5.

The correct operation of the dispenser comes from matching capacity between the pump chamber and the drop that is dispensed, and from the large internal volume of the cannula that serves as a fluid damping chamber before the drop is formed.

What is claimed is:

1. A fluid dispenser comprising:
   a fluid reservoir containing a fluid dispensable in drops;
   a pump comprising a pump body and an actuator rod, defining between them a pump chamber having a predetermined maximum volume, the rod being axially movable in the body so as to vary the volume of the pump chamber; and
   a dispenser cannula that is mounted on the actuator rod and that includes a dispenser outlet that is configured to form a drop of the fluid that separates from the cannula by gravity, the determined maximum volume of the pump chamber being substantially equal to the volume of the drop of fluid that is dispensed at the dispenser outlet.

2. The dispenser according to claim 1, wherein the dispenser cannula defines a predetermined internal volume that corresponds to about 3 to 7 times the maximum volume of the pump chamber.

3. The dispenser according to claim 1, wherein the dispenser cannula is made out of a transparent material.

4. The dispenser according to claim 1, wherein the cannula is elongate, thereby presenting a general configuration of a pipette.

5. The dispenser according to claim 1, including a pusher for actuating the pump, the pusher being secured to the reservoir.

6. The dispenser according to claim 1, including a casing in which the reservoir is slidably mounted, the cannula being secured to the casing.

7. The dispenser according to claim 6, wherein the casing includes an open trailing end in which a pusher is axially movable, and a leading end in which the cannula is mounted in stationary manner, projecting axially with its dispenser outlet, the pusher, during actuation, moving the reservoir and the pump body in the casing, compressing a return spring.

8. The dispenser according to claim 1, wherein the reservoir includes a follower piston that moves as fluid is extracted from the reservoir.

9. The dispenser according to claim 1, wherein the maximum volume of the pump chamber lies in the range about 50 mL to about 70 mL.

10. The dispenser according to claim 3, wherein the transparent material is glass.

11. The dispenser according to claim 6, wherein the cannula is secured to the casing by bi-injection with the casing.

12. The dispenser according to claim 1, wherein the dispenser cannula defines a predetermined internal volume that corresponds to about 4 to 6 times the maximum volume of the pump chamber.

13. The dispenser according to claim 1, wherein the drop of fluid is dispensed from the cannula at a distal end of the cannula.

* * * * *